United States Patent
Hatanaka

(10) Patent No.: US 12,117,754 B2
(45) Date of Patent: Oct. 15, 2024

(54) IMAGE FORMING SYSTEM

(71) Applicant: CANON KABUSHIKI KAISHA, Tokyo (JP)

(72) Inventor: Yuichi Hatanaka, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 151 days.

(21) Appl. No.: 17/888,763

(22) Filed: Aug. 16, 2022

(65) Prior Publication Data

US 2023/0062516 A1 Mar. 2, 2023

(30) Foreign Application Priority Data

Aug. 30, 2021 (JP) ................................. 2021-140213

(51) Int. Cl.
G03G 15/00 (2006.01)
B42D 15/04 (2006.01)
G06F 3/12 (2006.01)

(52) U.S. Cl.
CPC ......... *G03G 15/5016* (2013.01); *B42D 15/04* (2013.01); *G03G 15/502* (2013.01); *G03G 15/6526* (2013.01); *G03G 15/6582* (2013.01); *G06F 3/121* (2013.01); *G06F 3/1234* (2013.01); *G06F 3/1253* (2013.01); *G03G 2215/00877* (2013.01)

(58) Field of Classification Search
CPC ............. G03G 15/5016; G03G 15/502; G03G 15/6526; G03G 15/6582; G03G 2215/00877; B42D 15/04; G06F 3/121; G06F 3/1234; G06F 3/1253
See application file for complete search history.

(56) References Cited

U.S. PATENT DOCUMENTS

| | | | | |
|---|---|---|---|---|
| 2004/0046797 A1* | 3/2004 | Perry | ................. | G03G 15/5087 715/771 |
| 2011/0133442 A1* | 6/2011 | Crane | .................. | B42D 25/355 428/347 |
| 2022/0134795 A1* | 5/2022 | Tsukada | ............... | B42D 25/455 270/4 |

FOREIGN PATENT DOCUMENTS

| | | | | | |
|---|---|---|---|---|---|
| JP | 2008238694 A | * | 10/2008 | ............. | B42C 11/02 |
| JP | 2011101973 A | * | 5/2011 | | |
| JP | 2014-035454 A | | 2/2014 | | |
| JP | 2022040915 A | * | 3/2022 | | |
| WO | WO-2012057202 A1 | * | 5/2012 | ............. | B31B 70/60 |

OTHER PUBLICATIONS

Yamada (Published May 26, 2011); JP-2011101973-A English Translation (Year: 2011).*

(Continued)

*Primary Examiner* — Ryan D Walsh
(74) *Attorney, Agent, or Firm* — Venable LLP

(57) ABSTRACT

An image forming system includes an image forming unit, a pressure-bonding processing unit, a display portion, and a control unit capable of controlling the image forming unit by acquiring image data for forming a toner image on a recording medium in an operation in an image forming mode. The control portion controls the display portion to issue a warning in a case that the toner image to be formed on an inner surface of the recording medium to be folded protrudes outside a film region, the film region being a region of the inner surface to which a thermosensitive adhesive film is to be supplied.

7 Claims, 8 Drawing Sheets

(56) References Cited

OTHER PUBLICATIONS

Wakatabi et al. (Published May 3, 2012); WO-2012057202-A1 English Translation (Year: 2012).*
Yokoya et al. (Published Oct. 9, 2008); JP-2008238694-A English Translation (Year: 2008).*
Matsuzaki et al. (Published Mar. 11, 2022); JP-2022040915-A English Translation (Year: 2022).*

* cited by examiner

WARNING

IMAGE IS IN NON-CORRESPONDING POSITION TO
PRESSURE-BONDING POSTCARD PROCESSING.
ALTHOUGH THERE IS POSSIBILITY OF
DISABLEMENT OF NORMAL PROCESSING,
DO YOU EXECUTE PRINT & PROCESSING ?

| EXECUTE PRINT & PROCESSING | EXECUTE ONLY PRINT | CANCEL PRINT |

Fig. 4

| FINISHED SIZE | | | FOLD MNNR | IMAGING-PROHIBITED REGION (DOWNWARD LEADING END BASIS) | |
|---|---|---|---|---|---|
| KIND | FEED LENGTH | WIDTH | | FIRST SIDE (FRONT SURFACE) | SECOND SIDE (BACK SURFACE) |
| POST-CARD | 100mm | 148mm | BI-FOLD | 96.01mm ≤ & ≤ 102.99mm | – |
| | | | Z-FOLD | 96.01mm ≤ & ≤ 102.99mm | 195.52mm ≤ & ≤ 202.49mm |
| A4 | 210mm | 297mm | BI-FOLD | 205.47mm ≤ & ≤ 212.44mm | – |
| A5 | 148mm | 210mm | BI-FOLD | 143.78mm ≤ & ≤ 150.75mm | – |
| B5 | 182mm | 257mm | BI-FOLD | 177.61mm ≤ & ≤ 184.58mm | – |

Fig. 6

IMAGE FORMING SYSTEM

FIELD OF THE INVENTION AND RELATED ART

The present invention relates to an image forming system capable of preparing a pressure-bonding print by forming an image on a recording medium, folding (bending) the recording medium on which the image is formed, and pressure-bonding the recording medium under application of heat and pressure to the folded recording medium.

Conventionally, the image forming system for preparing the pressure-bonding print has been proposed (Japanese Laid-Open Patent Application (JP-A) 2014-35454). As the pressure-bonding print, it is possible to cite, for example, a pressure-bonding postcard from which a toner image formed on surfaces (sides) of a folded recording medium cannot be read until the surfaces are pseudo-bonded together by being superposed on each other and then are peeled off from each other. Here, pseudo-bonding refers to one form of bonding such that the recording medium is peelable after the bonding and is not readily bonded after the peeling. As a type in which the pseudo-bonding is made, there is a film type in which a thermosensitive adhesive film is supplied to between surfaces (surfaces) superposed on each other by folding the recording medium (hereinafter, these surfaces (sides) are referred to as pressure-bonding surfaces (pressure-bonding sides)) and then the surfaces of the folded recording medium are bonded together under application of heat and pressure.

However, in the case of the above-described film type, the recording medium is pressure-bonded under application of heat and pressure, and therefore, in the case where a toner image is formed outside a film region, when peeling of the recording medium is made, a part of the toner image formed outside the film region was peeled off in the pressure-bonding sides in some instances. That is, outside a region in which the adhesive film is superposed on the recording medium at the pressure-bonding sides, the toner formed on one pressure-bonding side contacts the toner formed on the other pressure-bonding side or contacts a white background portion. For that reason, conventionally, there was a liability that when peeling of the recording medium is made, the toner is peeled off from one pressure-bonding side and is transferred onto the other pressure-bonding side in some instances, and thus a part of the toner image blurs and the white background portion is contaminated with the toner.

SUMMARY OF THE INVENTION

In view of the above-described problem, a principal object of the present invention is to provide an image forming system in which in a constitution such that a folded recording medium is bonded by an adhesive film, toner transition is prevented from occurring outside a film region in which folded portions of the adhesive film are superposed on each other.

According to an aspect of the present invention, there is provided an image forming system comprising: an image forming unit capable of executing an operation in an image forming mode for forming a toner image on a recording medium; a pressure bonding processing unit capable of executing an operation in a pressure bonding processing mode in which the recording medium is folded at a predetermined folding position so that one surface of the recording medium is folded to provide opposing inner surfaces and a thermosensitive adhesive film is supplied to the inner surfaces of the folded recording medium and then in which the folded recording medium is pressure bonded under application of heat and pressure; a display portion configured to display information; and a control unit configured to control the image forming unit by acquiring image data for forming the toner image on the recording medium in the operation in the image forming mode, and configured to control the display portion to issue a warning in a case that the toner image to be formed on the inner surface protrudes outside a film region, the film region being a region of the inner surface to which the thermosensitive adhesive film is to be supplied.

Further features of the present invention will become apparent from the following description of exemplary embodiments with reference to the attached drawings.

BRIEF DESCRIPTION OF THE DRAWINGS

FIG. 4 is a schematic view showing an example of a warning screen.

Figure 5:
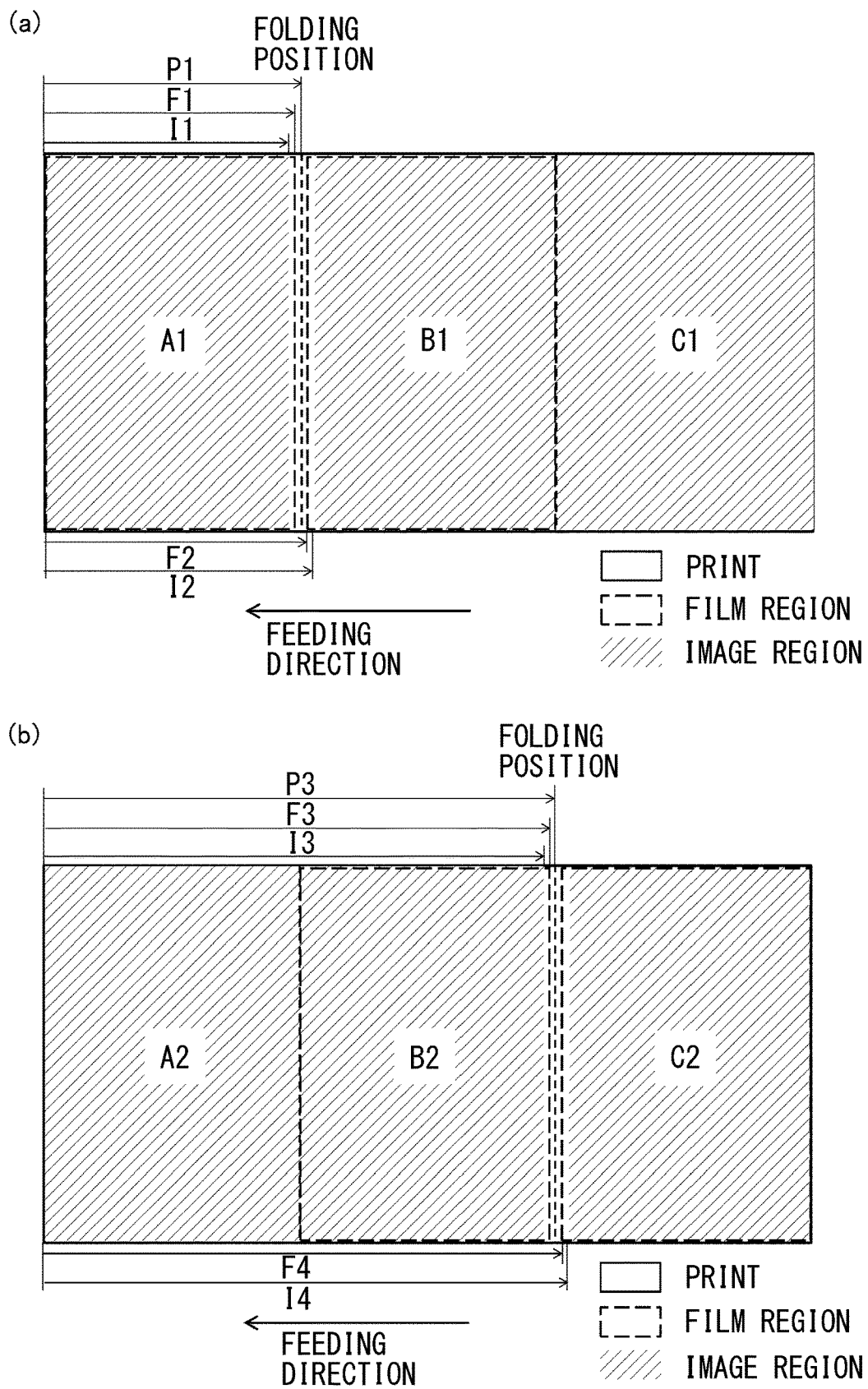

Part (a) of FIG. 5 is a schematic view showing an image forming region and a film region on a first surface side (front surface) of a recording medium, and part (b) of FIG. 5 is a schematic view showing an image forming region and a film region on a second surface side (back surface) of the recording medium.

FIG. 6 is a table showing an image formation prohibition table.

Figure 7:
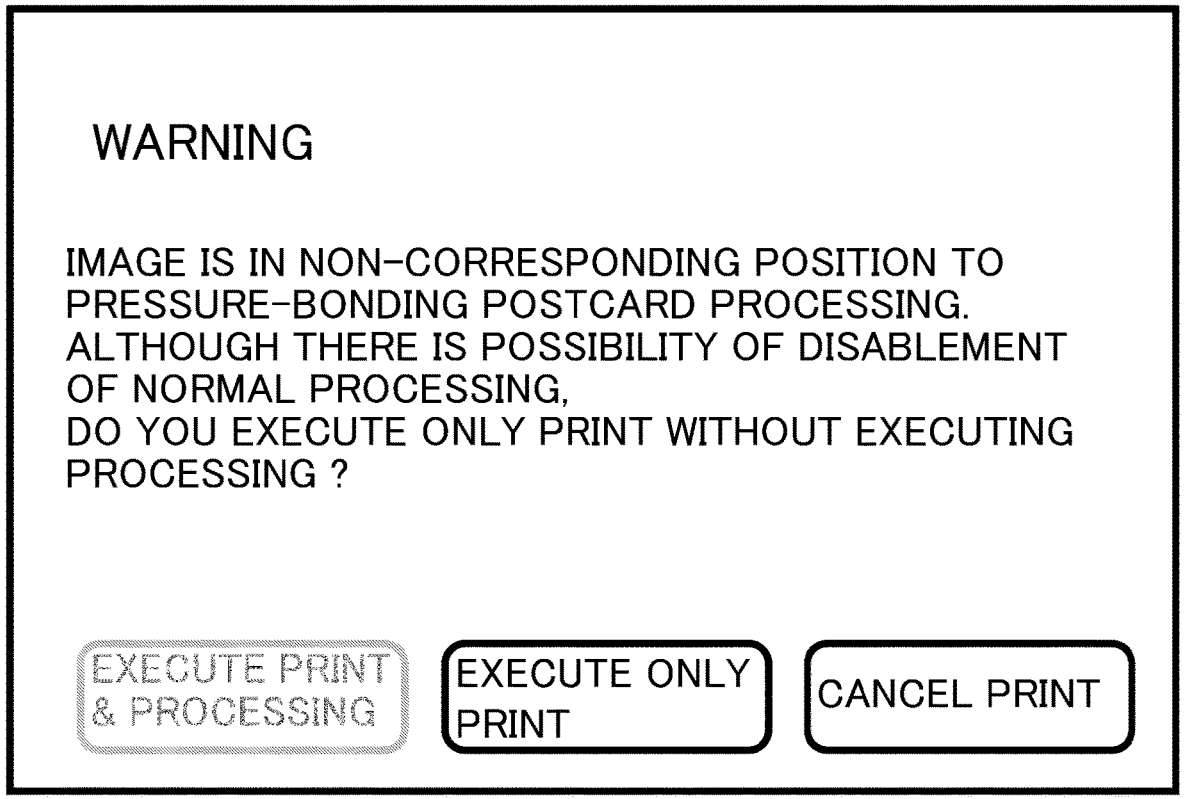

FIG. 7 is a schematic view showing another example of the warning screen.

Figure 8:
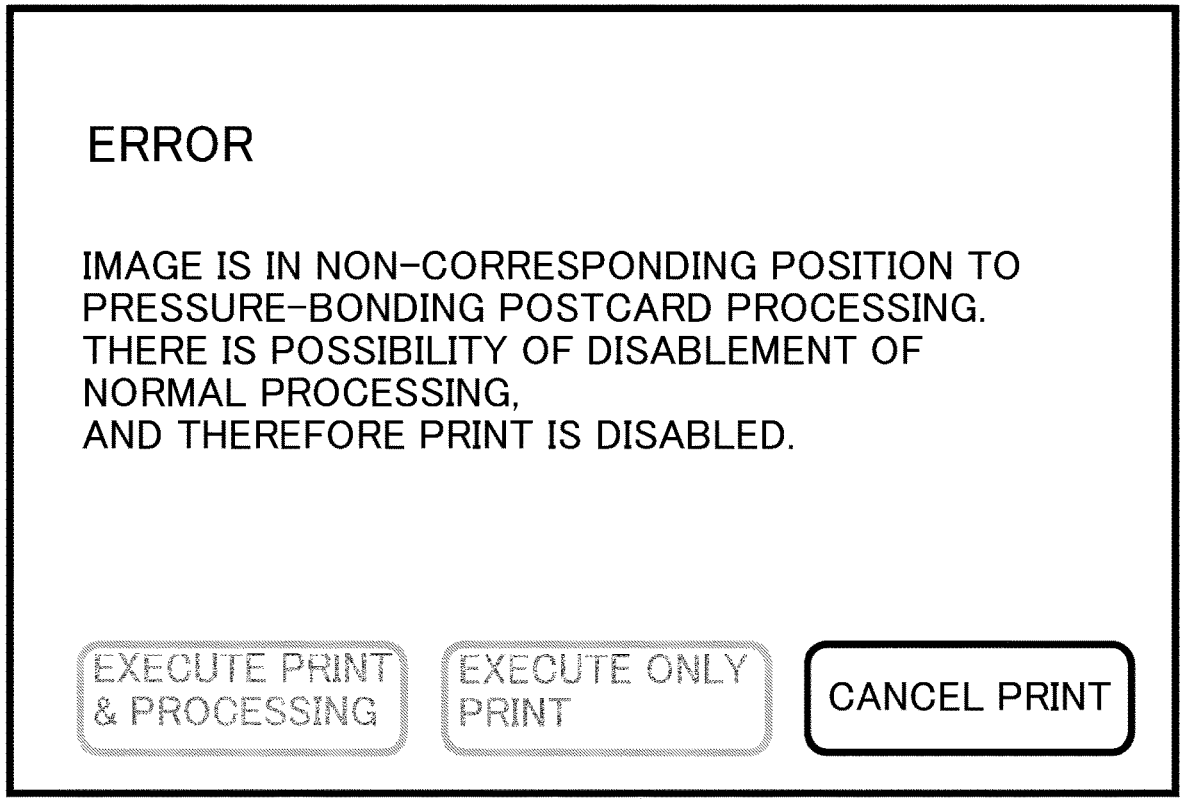

FIG. 8 is a schematic view showing an example of an error screen.

DESCRIPTION OF THE EMBODIMENTS

First Embodiment

<Image Forming System>

In the following, this embodiment will be described. First, an image forming system 1X of this embodiment will be described. The image forming system 1X of this embodiment includes an image forming apparatus 100 capable of executing an operation in an image forming mode for forming a toner image on a recording medium S and a pressure-bonding processing apparatus 200 capable of executing an operation in a pressure-bonding processing made for subjecting the recording medium S, on which the toner image is formed by the image forming apparatus 100, to pressure-bonding processing. The pressure-bonding processing apparatus 200 is a post-step unit retrofittable to the image forming apparatus 100 for expanding function, and the image forming apparatus 100 and the pressure-bonding processing apparatus 200 are connected to each other so as to be capable of delivering the recording medium S therebetween. This image forming system 1X is capable of preparing a pressure-bonding print such as a pressure-bonding postcard by feeding the recording medium S, on which the image is formed by the image forming apparatus 100, to the pressure-bonding processing apparatus 200 and then by folding and pressure-bonding the recording medium S by the pressure-bonding processing apparatus 200.

Figure 1:
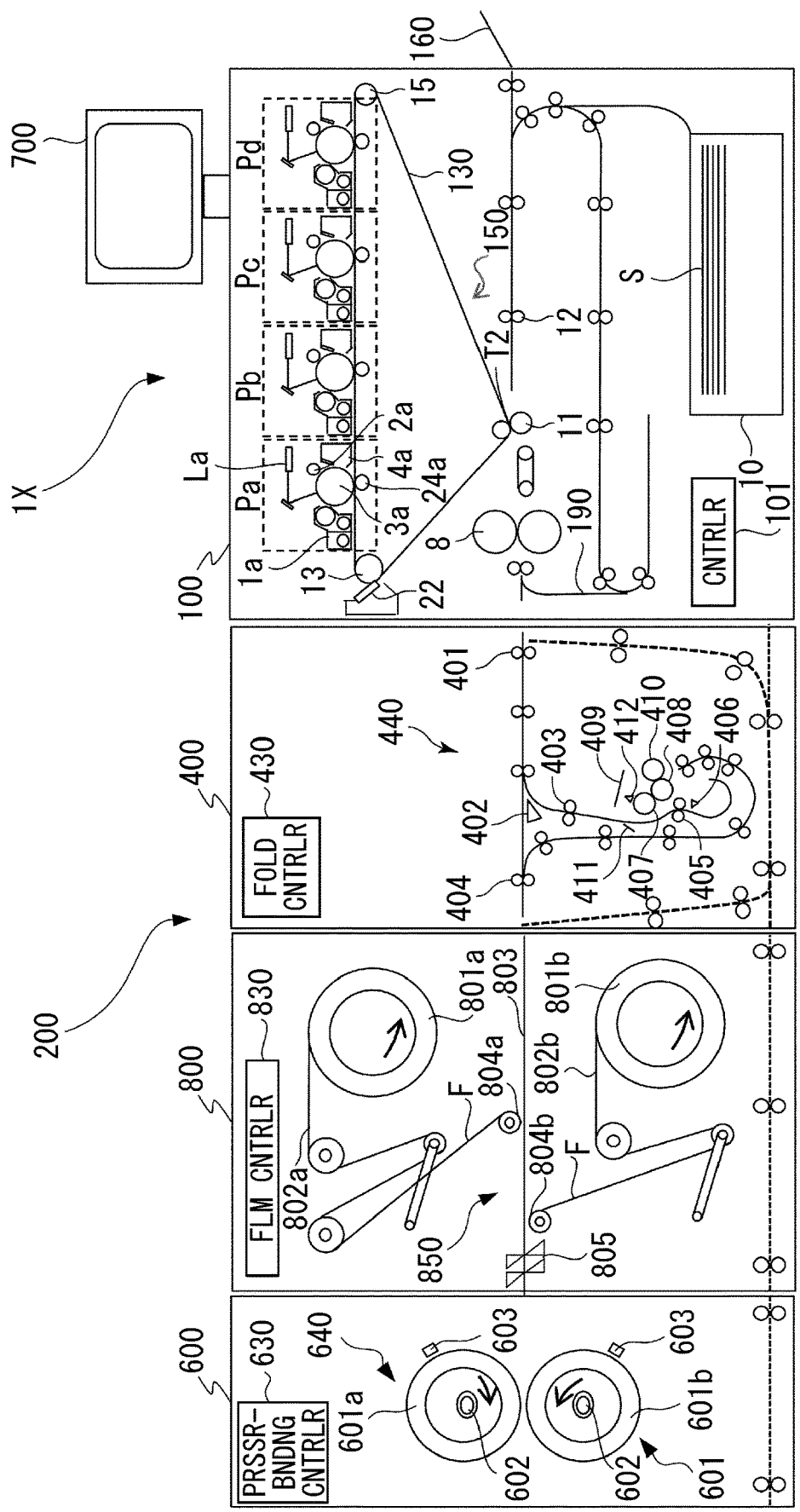
FIG. 1 is a schematic view showing an embodiment of an image forming system.

In FIG. 1, as the pressure-bonding processing apparatus 200, an apparatus including a varnish application apparatus 300, a folding processing apparatus 400, a film supplying apparatus 800, and a pressure-bonding apparatus 600 was shown as an example. The image forming apparatus 100, the folding processing apparatus 400, the film supplying apparatus 800 and the pressure-bonding apparatus 600 are connected to each other by input/output interfaces (not shown) capable of serial communication or parallel communication.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. As shown in FIG. 1, the image forming apparatus 100 forms a toner image on the recording medium S on the basis of image data sent from an original reading device (not shown) connected to an apparatus main assembly or from an external device (not shown) such as a personal computer or an external controller connected to the apparatus main assembly so as to be capable of inputting and outputting data. As the recording medium S, it is possible to use recording media which are sheet media, such as non-coated paper, coated paper, and synthetic paper, and which are foldable.

As shown in FIG. 1, the image forming portions Pa, Pb, Pc, and Pd are juxtaposed along a movement direction of the intermediary transfer belt 130 in the apparatus main assembly. The intermediary transfer belt 130 is stretched by a plurality of rollers (13, 14, 15) and is rotated. Then, the intermediary transfer belt 130 carries and feeds a toner image transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording medium S is formed. On a side downstream of the secondary transfer portion T2 with respect to a recording medium feeding direction, a fixing device 8 is provided. Incidentally, in the case of this embodiment, an image forming unit 150 for forming the toner images on the recording medium S is constituted by the image forming portions Pa to Pd, the intermediary transfer belt 130, the rollers (13, 14, 15), the outer secondary transfer roller 11, and the like.

At a lower portion of the image forming apparatus 100, a cassette 10 in which recording media S are accommodated. The recording medium S is fed from the cassette 10 toward a registration roller pair 12 by a feeding roller 16. Thereafter, the registration roller pair 12 is started to be rotated in synchronism with the toner image formed on the intermediary transfer belt 130, so that the recording medium S is fed toward the secondary transfer portion T2. A plurality of cassettes 10 capable of accommodating the recording media S different in size and thickness are provided, and the recording medium S selected by a user is fed from either one of the plurality of cassette 10. Incidentally, the recording medium S is not limited to the recording medium S accommodated in the cassette 10, but the recording medium S stacked on a manual feeding tray 160 may also be fed. Further, a constitution in which the recording medium S accommodated in an unshown sheet feeding apparatus which is used as an option and which is connected, as a casing different from the image forming apparatus 100 may be employed.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from illustration and description.

In the image forming portion Pa for yellow, a cylindrical photosensitive drum 3a is provided as a photosensitive member. The photosensitive drum 3a is rotationally driven in a predetermined direction at a predetermined process speed. At a periphery of the photosensitive drum 3a, a charging device 2a, an exposure device La, a developing device 1a, a primary transfer roller 24a, and a drum cleaning device 4a are provided.

A process for forming, for example, a full-color image by the image forming apparatus 100 will be described. First, when an image forming operation is started, a surface of the rotating photosensitive drum 3a is electrically charged uniformly by the charging device 2a. The charging device 2a is a corona charger or the like for charging the photosensitive drum 3a to a uniform negative dark-portion potential by irradiating the photosensitive drum 3a with charge particles with corona discharge, for example. Then, the photosensitive drum 3a is subjected to scanning exposure to laser light which is emitted from the exposure device La and which corresponds to an image signal. By this, an electrostatic latent image depending on the image signal is formed on the surface of the photosensitive drum 3a. The electrostatic latent image formed on the photosensitive drum 3a is developed into a toner image which is a visible image by a developer, containing toner and a carrier accommodated in the developing device 1a. In the case of this embodiment, in the developing device 1a, as the developer, a two-component developer containing non-magnetic toner and a magnetic carrier is used.

The toner image formed on the photosensitive drum 3a is transferred onto the intermediary transfer belt 130 at a primary transfer portion formed between the intermediary transfer belt 130 and the photosensitive drum 3a opposing the primary transfer roller 24a. At this time, to the primary transfer roller 24a, a primary transfer bias (voltage) is applied. After the transferring on the intermediary transfer belt 130, toner remaining on the surface of the photosensitive drum 3a is removed by the drum cleaning device 4a.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording medium S accommodated in the cassette 10 is fed to the secondary transfer portion T2. Then, by applying a secondary transfer bias (voltage) to the outer secondary transfer roller 11, the toner images for a full-color image formed on the intermediary transfer belt 130 are collectively transferred onto the recording medium S. Toner remaining on the intermediary transfer belt 130 after the transferring on the recording medium is removed by a belt cleaning device 22.

The recording medium S on which the toner images are formed is fed toward the fixing device 8. The fixing device 8 includes a roller pair, and at a fixing nip formed by the roller pair, the fixing device 8 nips and feeds the recording medium S on which the toner image is formed and thus heats and presses the recording medium S, so that the toner image is fixed on the recording medium S.

The image forming apparatus 100 of this embodiment is capable of performing double-side printing. In the case of single-side printing, the recording medium S on which the toner image is fixed is conveyed to the pressure-bonding processing apparatus 200. In the case of double-side printing, the recording medium S on which the toner image is fixed is conveyed toward a double-side reverse feeding passage 190. In the double-side feeding portion 190, the recording medium S is reversed, so that a front surface and a back surface of the recording medium S are replaced with each other. Then, the recording medium S is fed toward the registration roller pair 12 through the double-side feeding passage 190. Then, the recording medium S is fed by the registration roller pair 12 toward the secondary transfer portion T2 in a state in which the back surface side thereof where printing has not been carried out faces the intermediary transfer belt 130 side. At the secondary transfer portion T2, the toner images for a full-color image formed on the intermediary transfer belt 130 are collectively transferred on the back surface side of the recording medium S. Thereafter, the recording medium S is subjected to toner image fixing by the fixing device 8 and the recording medium S on which the toner image is formed is conveyed to the pressure-bonding processing apparatus 200.

Further, the image forming apparatus 100 includes a main controller 101. In the case of this embodiment, the main controller 101 is capable of controlling, as a control unit, the image forming apparatus 100 and the pressure-bonding processing apparatus 200. The main controller 101 is capable of permitting an operation in an image forming mode for forming the image on the recording medium S by the image forming apparatus 100 and which is capable of permitting an operation in a pressure-bonding processing mode for subjecting the recording medium S to folding and pressure-bonding by the pressure-bonding processing apparatus 200.

Next, the pressure-bonding processing apparatus 200 will be described. As shown in FIG. 1, the pressure-bonding processing apparatus 200 in this embodiment includes the folding processing apparatus 400, the film supplying apparatus 800, and the pressure-bonding apparatus 600.

<Folding Processing Apparatus>

The folding processing apparatus 400 is an apparatus for subjecting the recording medium S on which the image is formed by the image forming apparatus 100 to folding processing in which the recording medium S is folded. In this embodiment, as an example, the folding processing apparatus 400 of a roller press-contact type capable of folding the recording medium S in three or two was described. The folding processing apparatus 400 includes a folding processing controller 430, and a folding portion 440 as a folding processing unit for folding the recording medium S. The folding processing controller 430 principally carries out control of the folding portion 440.

An operation of the folding portion 440 will be described by taking tri-fold processing (for example, outward tri-fold processing (Z-fold processing)) in which the recording medium S is folded in three in a zigzag form, as an example. The recording medium S conveyed from the image forming apparatus 100 is drawn into the folding processing apparatus 400 by an inlet roller pair 401 is sorted into separate folding passages by a branch flapper 402 depending on whether or not the folding processing is needed. That is, in the case where the folding processing is carried out, the recording medium S is sorted into a folding processing passage toward a folding roller pair 403, and in the case where the folding processing is not carried out, the recording medium S is sorted into a folding processing avoidance passage toward a discharging roller pair 404.

In the case where the recording medium S is sorted into the folding processing passage, the recording medium S is subjected to registration correction such that the recording medium S is once stopped at a position of a registration roller pair 405 and a loop is formed. The recording medium S subjected to the registration correction is fed again, and at a predetermined timing after the recording medium S passes through a folding position detecting sensor 406, the recording medium S is subjected to first folding processing simultaneously with drawing of the recording medium S by a first folding roller 407 and a second folding roller 408. Then, when the drawn recording medium P abuts against an abutment stopper 409, the recording medium S is subjected to second folding processing simultaneously with drawing of the recording medium S by the second folding roller 408 and a third folding roller 410. Thus, the recording medium S is folded in a first fold on a first surface side so that one surface portions oppose each other and is folded in a second fold on a second surface side so that the other surface portions oppose each other. Then, the recording medium S subjected to the second folding processing is conveyed toward the discharging roller pair 404 and is delivered to a subsequent film supplying apparatus 800 by the discharging roller pair 404. Incidentally, in the case where the recording medium S is sorted into the folding avoidance passage, the recording medium S is not subjected to the above-described tri-fold processing, and is delivered to the subsequent film supplying apparatus 800 by the discharging roller pair 404.

An operation of the folding portion 440 will be described by taking bi-fold processing as an example. In the case where the recording medium S is sorted into the folding processing passage, the recording medium S is subjected to the registration correction and then is fed again similarly as in the case of the above-described tri-fold processing. Then, in the case of the bi-fold processing, the recording medium S is drawn by the first folding roller 407 and the second folding roller 408 and passes through the folding position detecting sensor 406, and thereafter, when a trailing end of the recording medium S abuts against a trailing end abutment stopper 411, the recording medium S is subjected to the folding processing. The recording medium S is folded in two in a fold so that one surface portions oppose each other. At this time, the drawn recording medium S is guided by a leading end guide 412 moved to a predetermined position in advance, and thus is drawn by the second folding roller 408 and the third folding roller 410. The recording medium S drawn by the second folding roller 408 and the third folding roller 410 is conveyed toward the discharging roller pair 404 and is delivered to the subsequent film supplying apparatus 800 by the discharging roller pair 404. Incidentally, in the case where the recording medium S is sorted into the folding avoidance passage, the recording medium S is not subjected to the above-described bi-fold processing, and is delivered to the subsequent film supplying apparatus 800 by the discharging roller pair 404.

<Film Supplying Apparatus>

The film supplying apparatus 800 includes an adhesive film supply controller 830, film rollers 801a and 801b around which the adhesive film F is wound, and a film supplying portion 850 for supplying the adhesive film F to the recording medium S. The film supply controller 830 principally carries out control of the film supplying portion 850. The adhesive film F is prepared by, for example, for forming an adhesive layer for generating an adhesive force under application of heat and pressure to each of a front surface (side) and a back surface (side) of a bonded two layer-transparent film.

An elongated adhesive film F wound around the film rollers 801*a* and 801*b* is successively supplied along predetermined film supply passages 802*a* and 802*b*, respectively. The adhesive film F is supplied so as to be sandwiched between folded portions of the recording medium S when the recording medium S folded in three reaches each of a merge point 804*a* where a feeding passage 803 and the film supply passage 802*a* merge and a merge point 804*b* where the feeding passage 803 and the film supply passage 802*b* merge. Thereafter, the adhesive film F is cut in a desired dimension by a cutting member 805. On the other hand, the adhesive film F is supplied so as to be sandwiched between folded portions of the recording medium S when the recording medium S folded in two reaches the merging point 804*a*. Thereafter, the adhesive film F is cut in a desired dimension by the cutting member 805. Incidentally, the film supplying apparatus 800 cuts the adhesive film F so that on an inner surface (side) where the adhesive film F is supplied, a region where the adhesive film F is not superposed on an upstream side and a downstream side with respect to a fold in the feeding direction of the recording medium S (see, parts (a) and (b) of FIG. 5 described later).

<Pressure-Bonding Apparatus>

The pressure-bonding apparatus 600 is an apparatus for subjecting, to pressure-bonding for adhesively bonding the recording medium S by the adhesive film F, the recording medium S subjected to the above-described folding processing step by the pressure-bonding apparatus 600 and a supplying step of the adhesive film F. In this embodiment, as an example, the pressure-bonding apparatus 600 of a roller press-contact type capable of pressure-bonding processing of the recording medium S by applying heat and pressure to the recording medium S through the pressure-bonding roller pair nipping and conveying the recording medium S was described. The pressure-bonding apparatus 600 includes a pressure-bonding processing controller 630, and a pressure-bonding portion 640 as a pressure-bonding unit for pressure-bonding the recording medium S. The pressure-bonding processing controller 630 principally carries out control of the pressure-bonding portion 640. In this embodiment, the processing portion 440, the film supplying portion 850, and the pressure-bonding portion 640 are examples of the pressure-bonding processing unit.

The pressure-bonding portion 640 includes a pressure-bonding roller pair 601 for nipping and feeding the recording medium S by rotation, a heater 602 for heating the pressure-bonding roller pair 601, and a thermistor 603 for detecting a temperature of the pressure-bonding roller pair 601. The pressure-bonding roller pair 601 includes an upper roller 601*a* and a lower roller 601*b*, and each of the upper roller 601*a* and the lower roller 601*b* is maintained at a predetermined temperature by the heater 602 depending on a detection temperature of the thermistor 603. Then, the pressure-bonding roller pair 601 is capable of applying heat and pressure to the recording medium S while nipping and feeding the recording medium S in a folded state. By this, the recording medium S folded so that an application surface on which the varnish is applied is positioned inside thereof is subjected to pseudo-bonding in a manner such that opposing application surface portions are bonded together by the varnish.

<Control Constitution of Image Forming System>

Next, control of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the folding processing apparatus 400, the film supplying apparatus 800, and the pressure-bonding apparatus 600) and controls the apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
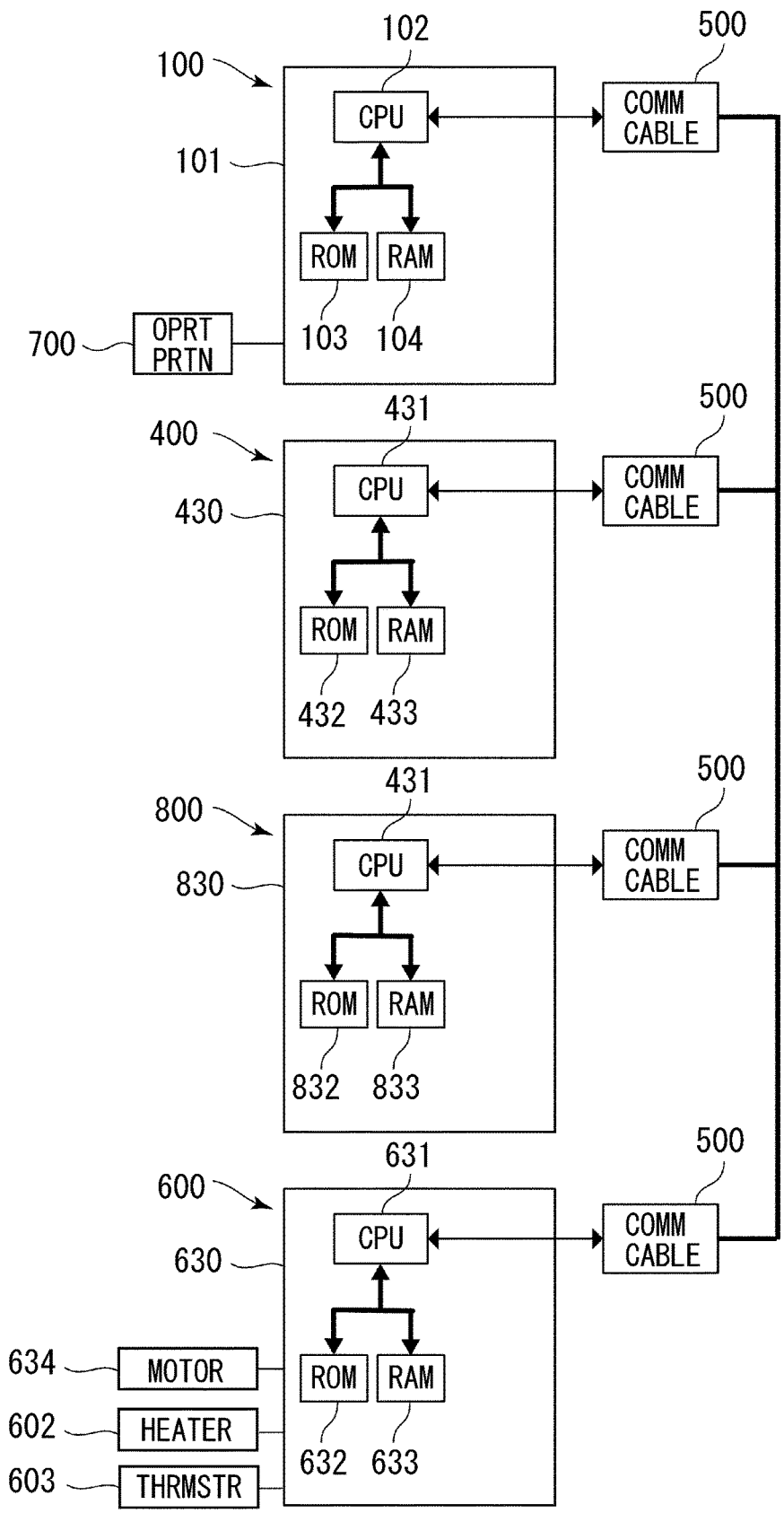
FIG. 2 is a control block diagram of the image forming system.

In the image forming system 1X of this embodiment, as shown in FIG. 2, to the main controller 101, the folding processing controller 430, the film supply controller 830, and the pressure-bonding processing controller 630 are connected via communication cables 500 so as to be capable of communicating operation instructions and various data. In accordance with the operation instructions from the main controller 101, the folding processing controller 430 causes the folding processing apparatus 400 to operate, the film supply controller 830 causes the film supplying apparatus 800 to operate, and the pressure-bonding processing controller 630 causes the pressure-bonding apparatus 600 to operate. That is, while the main controller 101 controls the operation of the image forming apparatus 100, the main controller 101 is capable of controlling entirety of the image forming system 1X by sending the operation instructions to the pressure-bonding processing apparatus 200 (the folding processing apparatus 400, the film supplying apparatus 800, and the pressure-bonding apparatus 600).

The main controller 101, the folding processing controller 430, the film supply controller 830, and the pressure-bonding processing controller 630 which are described above may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103 and the RAM 104 which are as a storing portion, various programs for a pressure-bonding print preparing process (see FIG. 3) and various data such as an image formation prohibition table (see, FIG. 5) which are described later. The RAM 104 is also capable of temporarily storing a calculation (computation) processing result or the like with execution of the various programs.

The image forming apparatus 100 includes an operating portion 700 including, for example, a liquid crystal display portion (see, FIG. 1), and the operating portion 700 as display portion or an input portion is connected to the main controller 101. The operating portion 700 is, for example, a touch panel, and on a liquid crystal display portion, various screws presenting the various programs and various data or the like can be displayed. Further, the operating portion 700 receives input of a start of the various programs and input of the various data depending on a user operation such as a touch operation by the user.

The user is capable of inputting a start of an "imaging job" and setting for preparing the pressure-bonding print through the operating portion 700. In the case where the "image forming job" is inputted, the CPU 102 executes the pressure-bonding print preparing process (program) stored in the ROM 103. With this execution, together with the image forming apparatus 100, the pressure-bonding processing apparatus 200 (the folding processing apparatus 400, the film supplying apparatus 800, and the pressure-bonding apparatus 600) is capable of being operated.

The folding processing controller 430 includes a CPU 431, a ROM 432, and a RAM 433. The CPU 431 causes the folding processing apparatus 400 to operate on the basis of a control program stored in the ROM 432. The film supply controller 830 includes a CPU 831, a ROM 832, and a RAM 833. The CPU 831 causes the film supplying apparatus 800 to operate on the basis of a control program stored in the ROM 832.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601, a heater 602 for heating the pressure-bonding roller pair 601, and a thermistor 603 for detecting a temperature of the pressure-bonding roller pair 601. The pressure-bonding processing controller 630 sends a detection result (temperature data) of the thermistor 603 to the main controller 101. Then, the pressure-bonding processing controller 630 is capable of changing the temperature of the heater 602 by receiving a target temperature from the main controller 101. Further, the pressure-bonding processing controller 630 is capable of changing the number of rotations of the motor 634 by receiving a target speed of the fed recording medium S from the main controller 101.

<Pressure-Bonding Print Preparing Processing>

Next, the pressure-bonding print preparing processing will be described using FIGS. 3 to 6 while making reference to FIGS. 1 and 2. The pressure-bonding print preparing processing in this embodiment is started to be executed by the main controller 101 with, for example, input of the start of the "image forming job" from the operating portion 700 or from an external device (not shown).

Figure 3:
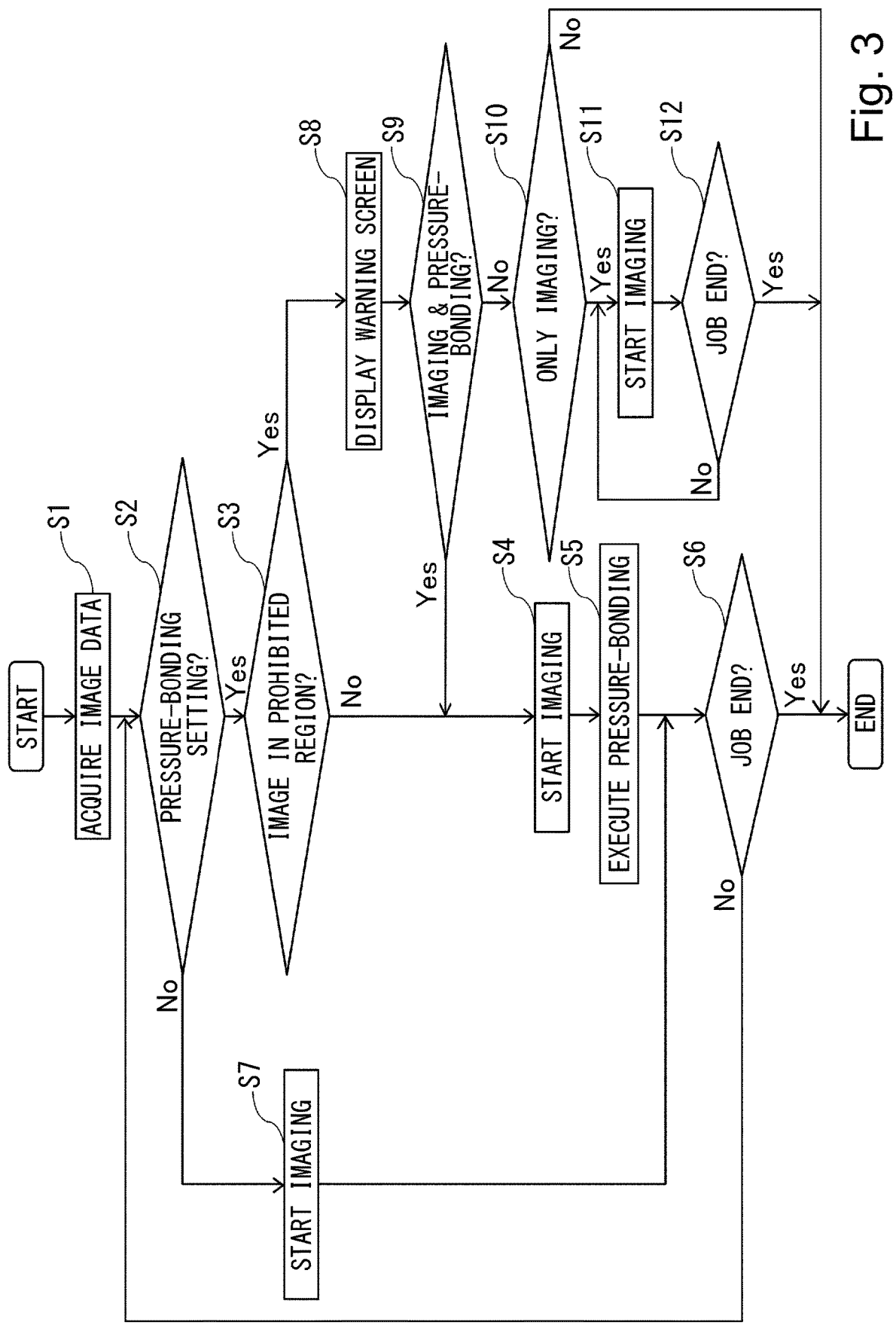
FIG. 3 is a flowchart showing pressure-bonding print preparing processing.

As shown in FIG. 3, the main controller 101 acquires image data from the original reading apparatus or the external device (S1). Then, the main controller 101 discriminates whether or not setting for preparing the pressure-bonding print by performing film pressure-bonding processing is made (S2). The setting for preparing the pressure-bonding print is capable of being made by a user through operation of the operating portion 700.

In the case where the setting for preparing the pressure-bonding print is not made (No of S2), the main controller 101 causes the image forming apparatus 100 to operate, so that toner image formation is started on the basis of the image data (S7). Thereafter, the main controller 101 discriminates whether or not the image forming job is ended (S6). In the case where the image forming job is not ended (No of S6), the sequence of the main controller 101 is returned to the processing of the step S2, and the processing of the steps S2 and S7 is repeated until the image forming job is ended. Thus, in the case where the setting for preparing the pressure-bonding print is not made, the image forming apparatus 100 operates and forms the toner image on the recording medium S, while the pressure-bonding processing apparatus 200 does not operate, so that the recording medium S on which the toner image is formed is outputted (discharged) as it is without being folded. That is, the recording medium S on which the toner image is formed is outputted, so that the pressure-bonding print is not prepared.

In the case where the setting for preparing the pressure-bonding print is made (Yes of S2), the main controller 101 discriminates whether or not there is the toner image to be formed outside the film region (hereinafter, referred to as an outside of film region) where portions of the adhesive film F are superposed on each other at the pressure-bonding sides (inner surfaces) of the recording medium S exists (S3). In the case of this embodiment, when the toner image to be formed in an image formation prohibition region defined by an "image formation prohibition table" (see, FIG. 6 described later) (this toner image corresponds to information on the toner image to be formed on the inner surfaces) exists in the toner image based on the acquired image data, the main controller 101 discriminates that the toner image to be formed on the outside of film region.

In the case where the toner image to be formed on the outside of film region (No of S3), the main controller 101 causes the image forming apparatus 100 to operate, and starts toner image formation on the basis of the image data.

Then, the main controller 101 causes the pressure-bonding processing apparatus 200 to execute the film pressure-bonding processing of the recording medium S every time when the toner image is formed on a single recording medium S by the image forming apparatus 100 (S5). In this case, the main controller 101 repeats the processing of the above-described steps S2, S3, S4, and S5 until the image forming job ends. Thus, in the case where the setting for preparing the pressure-bonding print is made, when the toner image to be formed on the outside of film region does not exist, the recording medium S on which the toner image is formed is subjected to the pressure-bonding processing by the pressure-bonding processing apparatus 200 and then is outputted.

On the other hand, in the case where the toner image to be formed on the outside of film region exists (Yes of S3), the main controller 101 stands by execution of the operation in the image forming mode and the operation in the pressure-bonding processing mode, and causes the operating portion 700 to display a "warning screen" (S8). An example of the "warning screen" is shown in FIG. 4. In the "warning screen" shown in FIG. 4, not only display notifying a message to the effect that the toner image to be formed on the outside of film region exists is made, but also display promoting the user to input an instruction to perform the processing is made. Further, in addition thereto, as software switches, a "print(ing)/processing execution" button, a "execute only print" button, and a "cancel print" button for execution instruction of the operation in the image forming mode and the operation in the pressure-bonding processing mode are displayed. The "print/processing execution" button is a button for providing an "instruction to execute both image formation and pressure-bonding processing", the "execute only print" button is a button for providing an "instruction to execute only image formation", and the "cancel print" button is a button for providing an "instruction to stop print".

Returns to description of FIG. 3, the main controller 101 executes the processing in accordance with the instruction by the user through the operating portion 700 using the above-described "warning screen". First, in the case where the instruction to "execute both image formation and pressure-bonding processing" is provided (Yes of S9), the main controller 101 causes the image forming apparatus 100 to start formation of the toner image (S4), and causes the pressure-bonding processing apparatus 200 to subject the recording medium S to the film pressure-bonding processing (S5). That is, in this case, the execution of the operation in the image forming mode and the operation in the pressure-bonding processing mode is permitted, so that even when the toner image to be formed on the outside of film region exists, the recording medium S on which the toner image is formed is subjected to the pressure-bonding processing by the pressure-bonding processing apparatus 200 and is outputted. That is, the pressure-bonding print is prepared.

Secondly, in the case where the instruction to "execute only print" is provided (No of S9, Yes of S10), the main controller 101 causes the image forming apparatus 100 to start the toner image formation (S11) and then to repeat the toner image formation until the image forming job ends (S12). That is, in this case, the execution of the operation in the image forming mode is permitted, while the execution of the operation in the pressure-bonding processing mode is not permitted and the recording medium S on which the toner image is formed is not subjected to the pressure-bonding processing by the pressure-bonding processing apparatus 200, so that the recording medium S on which the toner image is formed is outputted as it is without being folded. That is, the pressure-bonding print is not prepared.

Thirdly, in the case where the "print stop" instruction is provided (No of S9, Yes of S10), the main controller 101 forcedly ends the image forming job. That is, in this case, the execution of the operation in the image forming mode and the operation in the pressure-bonding processing mode is not permitted, so that the toner image formation for the image forming apparatus 100 and the pressure-bonding processing of the recording medium S by the pressure-bonding processing apparatus 200 are not carried out. That is, when the "print stop" instruction is provided, the recording medium S is not outputted.

Next, in this embodiment, the "image formation prohibition table" used for discriminating whether or not the toner image to be formed on the outside of film region exists will be described using part (a) of FIG. 5 to FIG. 6 while making reference to FIG. 1. As shown in parts (a) and (b) of FIG. 5, with respect to the feeding direction of the recording medium S, on the basis of a downstream leading end portion of the recording medium S, a length to a folding position is "Px", a length to an upstream end (trailing end) of the adhesive film is "Fx", and a length to an upstream end (trailing end) of the image forming region is "Ix". Incidentally, in part (a) of FIG. 5, when the recording medium S is folded in three, inner surfaces (first inner surfaces: A1, B1) constitute pressure-bonding sides by being folded in a valley and are adhesively bonded together by an adhesive film F (first adhesive film). Incidentally, in part (a) of FIG. 5, the pressure-bonding side B1 and a non-pressure-bonding side C1 are folded in a mountain therebetween. Incidentally, in part (b) of FIG. 5, when the recording medium S is folded in three, inner surfaces (second inner surfaces: B2, C2) constitute other pressure-bonding sides by being folded in a valley and are adhesively bonded together by an adhesive film F (second adhesive film). Incidentally, in part (b) of FIG. 5, the pressure-bonding side B2 and a non-pressure-bonding side A2 are folded in a mountain therebetween.

Incidentally, in part (b) of FIG. 5, the non-pressure-bonding side A2 is a back surface (side) of the pressure-bonding side A1, the pressure-bonding side B2 is a back surface of the pressure-bonding side B1, and the pressure-bonding side C2 is a back surface of the non-pressure-bonding side C1.

As shown in part (a) of FIG. 5, with respect to a first side (front surface) in the case of tri-fold processing, a length to a position of a fold (first fold) is "P1", a length to an adhesive film trailing end on the pressure-bonding side (A1) is "F1", and a length to an image forming region trailing end is "I1". Further, a length of an adhesive film leading end on the pressure-bonding side (B1) is "F2", and a length to an image forming region leading end is "I2". Further, as shown in part (b) of FIG. 5, with respect to a second side (back surface) in the case of the tri-fold processing, a length from a leading end to a position of a second fold is "P3", a length to an adhesive film trailing end on the pressure-bonding side (B2) is "F3", and a length to an image forming region trailing end is "I3". Further, a length to an adhesive film leading end on the pressure-bonding side (C2) is "F4", and a length to an image forming region leading end is "I4". Incidentally, in the case of bi-fold processing, the regions C1 and C2 do not exist, and therefore, back surfaces of the pressure-bonding sides A1 and B1 constitute non-pressure-bonding sides A2 and B2, respectively.

As shown in FIG. 1 described above, in the pressure-bonding processing apparatus 200, the recording medium S is folded by the folding processing apparatus 400 and then is conveyed to the film supplying apparatus 800. Then, in the case of this embodiment, the film supplying apparatus 800 inserts the adhesive film F of the adhesive film roller 801a (801b) into a merging point 804a (804b), and then causes a cutting member 805 to cut the adhesive film F. In the case where the film supplying apparatus 800 having such a constitution is used, although a film dimension after the cutting is shorter than the recording medium S with respect to the recording medium feeding direction, the film dimension is equal to the recording medium S with respect to a widthwise direction (crossing the recording medium feeding direction) of the recording medium S. Accordingly, in this case, a discrimination condition as to whether or not the toner image to be formed on the outside of film region exists may only be required to be set with respect to only the recording medium feeding direction.

Incidentally, for example, in the case where the constitution in which the adhesive film F is cut and then inserted by the film supplying apparatus 800 is employed, with respect to the both the feeding direction and the widthwise direction of the recording medium S, there is a need to set the discrimination condition as to whether or not the toner image to be formed on the outside of film region on the pressure-bonding side of the recording medium S exists. In the following, for easy understanding of explanation, the case where the discrimination condition as to whether or not the toner image to be formed on the outside of film region exists is set with respect to only the feeding direction will be described as an example.

As described above, in this embodiment, depending on whether or not the toner image to be formed on the outside of film region on the pressure-bonding side of the recording medium S exists, execution or non-execution of the film pressure-bonding processing after the toner image formation is determined (see, S3 of FIG. 3). In the case of the bi-fold processing, when a formula 1 below is satisfied for the pressure-bonding side (A1) and a formula 2 below is satisfied for the pressure-bonding side (B1), on the pressure-bonding sides of the recording medium S, discrimination that the toner image to be formed on the outside of film region does not exist can be made. Incidentally, the length "F1! to the adhesive film trailing end and the length "I1" to the image forming region trailing end may preferably be set in consideration of the influence of adhesive film insertion accuracy and the influences of a leading end misregistration amount and image magnification, respectively.

$$F1>I1 \qquad \text{(formula 1)}$$

$$I2>P1+(P1-F1) \qquad \text{(formula 2)}$$

In the case of the tri-fold processing, in addition to the above-described formulas 1 and 2, a formula 3 below is satisfied for the pressure-bonding side (B2) and a formula 4 below is satisfied for the pressure-bonding side (C2), on each of the pressure-bonding sides on double sides of the recording medium S, discrimination that the toner (first toner image, second toner image) to be formed on the outside of film region (first film region, second film region) can be made.

$$F3>I3 \qquad \text{(formula 3)}$$

$$I4>P3+(P3-F3) \qquad \text{(formula 4)}$$

Specific numerical values will be described using those of a postcard as an example. A finished size of the postcard is 100 mm in length of the feeding direction and 148 mm in length of the widthwise direction (see, FIG. 5), and therefore, in the case where the recording medium S is subjected to bi-fold pressure-bonding processing, an original size of the recording medium S is "200 mm×148 mm". This recording medium S is set in the cassette 10 so that a long side of 200 mm coincides with the feeding direction. The recording medium S on which the toner image is formed by the image forming apparatus 100 is conveyed to the pressure-bonding processing apparatus 200. Then, the folding processing apparatus 400 folds the recording medium S in two by providing a fold at a position of 100 mm from a leading end position toward an upstream side with respect to the recording medium feeding direction. The recording medium S folded in two is conveyed to the film supplying apparatus 800, and in the merging point 804a, the adhesive film F is inserted into the recording medium S folded in two.

As described above, it is preferable that the length "F1" to the adhesive film trailing end is set in consideration of the influence of the adhesive film insertion accuracy and that the length "I1" to the image forming region trailing end is set in consideration of the influences of leading end misregistration amount and the image magnification. That is, the length "F1" to the adhesive film trailing end shown in part (a) of FIG. 5 has to satisfy the above-described formulas 1 and 2 so that the toner image does not protrude from the adhesive film F by being shifted even when the adhesive film F is inserted from a position remotest from the folding position and even when the toner image is formed to a position where the length "I1" to the image forming region trailing end is closest to the folding position.

In this embodiment, the insertion accuracy of the adhesive film F is "±1 mm". In this case, in order to prevent the folding of the adhesive film F in the folding position, there is a need that a nominal position "F1'" where the adhesive film leading end reaches during the insertion is set at a position spaced from the folding position by "1 mm". Therefore, the nominal position "F1'" is "99 mm" from the leading end of the recording medium S. Accordingly, the length of the adhesive film F with respect to the feeding direction becomes "99±1 mm", but a position where the length of the adhesive film F with respect to the feeding direction becomes shortest is a position where an insertion position of the adhesive film F to the nominal position becomes shallowest, and therefore, in the case of this embodiment, the length "F1" is set at "98 mm".

On the other hand, as regards the image formation region, in the case where the leading end misregistration amount is "±1.5 mm" relative to the nominal position and the image magnification is "±0.5%", in consideration of these influences, from the above-described formula 1, the length "I1" has to be shorter than "98 mm". In this case, from the above-described formula 2, a nominal position "I1'" from the leading end of the recording medium S with respect to the feeding direction to the image forming region trailing end can be calculated from a formula 5 below since the case where the length "I1" becomes longest is the case where in a state in which the image is extended from a predetermined length by "0.5%", the image forming region is shifted from the nominal position "I1'" toward a downstream side by "1.5 mm" with respect to the feeding direction.

$$98>(I1'\times 1.005)+1.5 \qquad \text{(formula 5).}$$

Then, the nominal position "I1'" is calculated as less than about "96.0199 . . . ", and when all numbers below the third decimal place are omitted, the nominal position "I1'" is "96.01 mm or less" from the leading end of the recording medium S. Accordingly, the formula 1 is satisfied in the case where the toner image exists only in a region from the leading end of the recording medium S to "96.01 mm" with respect to the feeding direction.

Further, as regards the pressure-bonding side (B1), the length "F2" of the adhesive film with respect to the feeding direction is "102 mm" because the pressure-bonding side (B1) has a line-symmetrical positional relationship with the pressure-bonding side (A1) with respect to the folding position. Similarly, from the above-described formula 2, the length "I2" to the image forming region leading end of the pressure-bonding side (B1) has to be longer than "102 mm". Further, the case where the length "I2" to the image forming region leading end of the pressure-bonding side (B1) becomes shortest is the case where the image forming region is shifted from the nominal position "I2" toward the downstream side "1.5 mm" with respect to the feeding direction in a state in which the image is extended from a predetermined length by "0.5%". Accordingly, from the above-described formula 2, the nominal position "I2'" can be calculated by the following formula 6.

$$102<(I2'\times 1.005)-1.5 \qquad \text{(formula 6)}$$

In accordance with the formula 6, the nominal position "I2'" is calculated as being longer than about "102.9850 . . . ", and when all numbers below the third decimal place are rounded up, the nominal position "I2'" is "102.99 mm" or more from the leading end of the recording medium S. Here, a region where the toner image should not be formed in the case where the film pressure-bonding processing is carried out is defined as an "image formation prohibition region" (imaging-prohibited region)", and in this embodiment, the image formation prohibition region is used as information on the film region. The image formation prohibition region on the first side (front surface) is a region of "96.01 mm to 102.99 mm" from the leading end with respect to the feeding direction in combination with the above-described calculation results. Further, the image formation prohibition region on the second side (back surface) is a region of "195.52 mm to 202.49 mm" when calculation is made similarly as in the above-described manner. Incidentally, in the case of the tri-fold processing, satisfaction that in both the image formation prohibition region on the first side (front surface) and the image formation prohibition region on the second side (back surface), the toner layer is not formed is a condition for carrying out the film pressure-bonding processing.

Here, in the image formation prohibition table shown in FIG. 6, the image formation prohibition region is set for each of finished sizes as pressure-bonding prints, i.e., depending on sizes and folding manners (bi-fold processing, tri-fold processing) of the recording media S (postcard, A4, A4, B5, and the like) after the film pressure-bonding processing. The main controller 101 discriminates whether or not the film pressure-bonding processing can be carried out, in accordance with the image formation prohibition region depending on the sizes and the folding manners of the recording media S after the film pressure-bonding processing. Incidentally, in the image formation prohibition table, the sizes and the manners of the recording media S after the film pressure-bonding processing are not limited to examples shown in FIG. 6, but can be freely set appropriately in conformity to purposes, and correspondingly, the image formation prohibition region may be set.

Incidentally, the insertion accuracy of the adhesive film F, the image leading end misregistration amount, and the image magnification are different in general for each of kinds of the film supplying apparatus 800 used and the image forming apparatus 100 used. For that reason, adjustment has to be appropriately made depending on these conditions, so that values of the image formation prohibition region in the "image formation prohibition table" are not limited to the values shown in FIG. 6. Further, in this embodiment, as a cause of deviation of the image forming region from the nominal position, the leading end misregistration amount and the image magnification were taken into consideration. However, the present invention is not limited thereto, and the image formation prohibition region may preferably be set in consideration of the influences of oblique movement such that the recording medium S is obliquely conveyed, perpendicularity generated by generatrix deviation principally of the laser scanner, the photosensitive drum, the intermediary transfer belt, and the like, parallelism such that the recording medium S is conveyed while being curved without moving straight, and the like.

As described above, in this embodiment, in the case where the toner image is formed on the recording medium S and then the recording medium S is folded and subjected to the pressure-bonding processing with the adhesive film F, when the toner image to be formed on the outside of film region, the main controller stands by the execution of the operation in the image forming mode and the operation in the pressure-bonding processing mode. Then, the main controller causes the operating portion 700 to display the message to the effect that the toner image to be formed on the outside of film region exists and notifies the user of the message, and caused the user to be capable of selecting execution or non-execution of the operation in the image forming mode and the operation in the pressure-bonding processing mode in that case. By doing so, in the case where the toner image to be formed on the outside of film region exists, the pressure-bonding print is not outputted with no permission of the user. Accordingly, in the case where a constitution in which the folded recording medium is bonded by the adhesive film F and thus the resultant pressure-bonding print is capable of being outputted is employed, it is possible to easily realize that the toner transfer is prevented from occurring on the outside of film region where the adhesive film F is superposed.

In the case of this embodiment, the user is capable of selecting the mode so as not to simply output the pressure-bonding print and the mode so as to output the recording medium S in a manner such that the toner image is formed on the recording medium S but the recording medium S is not subjected to the pressure-bonding processing, and the user is also capable of selecting the mode so as to dare to output the pressure-bonding print. In the case where the toner image is formed on the recording medium S but the recording medium S is outputted without being subjected to the pressure-bonding processing, it is convenient for the user to perform image edition such that the user erases the toner image to be formed on the outside of film region. Further, in the case where the user dares to output the pressure-bonding print, it is convenient for the user to check whether or not the toner transfer actually occurs on the outside of film region.

Other Embodiments

Incidentally, in the above-described embodiments, by the "warning screen" shown in FIG. 4, the user is not only notified of the message to the effect that the toner image to be formed on the outside of film region exists but also prompted to input an instruction to perform the processing, but the "WS" is not limited thereto. For example, as in a "warning screen" shown in FIG. 7, the "execute only print" button and the "cancel print" button are displayed, and the user may be caused to select execution of only the print(ing) or non-execution of even the print. Or, as in a "warning screen" shown in FIG. 8, the "cancel print" button may be displayed but the "execute only print" button is not displayed so that the user is notified of the message to the effect that the toner image to be formed on the outside of film region exists and the user can input an instruction to stop the print but cannot input an instruction to execute the print.

Incidentally, when the constitution in which the above-described pressure-bonding print preparing processing is executed is employed, the controller for controlling the image forming system 1X may be provided in any casing. For example, a constitution in which the controller for controlling entirety of the image forming system 1X is the above-described main controller 101 or an external device, or is provided inside any one of the apparatuses of the pressure-bonding processing apparatus 200, and executes the above-described pressure-bonding print preparing processing (FIG. 3) may be employed.

Incidentally, in the above-described embodiments, the image forming system 1X in which the pressure-bonding processing apparatus 200 is connected as a different casing to the apparatus main assembly of the image forming apparatus 100 was described as an example, but the pressure-bonding processing apparatus 200 may be provided inside the apparatus main assembly (inside the same casing) of the image forming apparatus 100. In that case, the main controller 101 also operates as the folding processing controller 430 the film supply controller 830 and the pressure-bonding processing controller 630, which are described above.

According to the present invention, in the constitution in which the folded recording medium is bonded by the adhesive film, it is realize that the toner transfer does not occur on the outside of film region where the adhesive film is superposed.

While the present invention has been described with reference to exemplary embodiments, it is to be understood that the invention is not limited to the disclosed exemplary embodiments.

The scope of the following claims is to be accorded the broadest interpretation so as to encompass all such modifications and equivalent structures and functions.

This application claims the benefit of Japanese Patent Application No. 2021-140213 filed on Aug. 30, 2021, which is hereby incorporated by reference herein in its entirety.

What is claimed is:

1. An image forming system comprising:
   an image forming unit capable of executing an operation in an image forming mode for forming a toner image on a recording medium;
   a pressure-bonding processing unit including a folding processing portion, a film supplying portion and a pressure-bonding portion, and capable of executing an operation in a pressure-bonding processing mode in which the recording medium is folded at a predetermined folding position so that one surface of the recording medium is folded to provide opposing inner surfaces by said folding processing portion and a thermosensitive adhesive film is supplied to the inner surfaces of the folded recording medium by said film supplying portion and then in which the folded recording medium is pressure-bonded under application of heat and pressure by said pressure-bonding portion;

a display portion configured to display information; and a control unit configured to control said image forming unit by acquiring image data for forming the toner image on the recording medium in the operation in the image forming mode, and configured to control said display portion to issue a warning in a case that the toner image to be formed on the inner surface protrudes outside a film region, the film region being a region of the inner surface to which the thermosensitive adhesive film is to be supplied, wherein said pressure bonding processing unit supplies the adhesive film to the folded recording medium so that a region in which the adhesive film is not superposed on the inner surfaces is formed on sides upstream and downstream of the fold with respect to a feeding direction of the recording medium, and wherein the region the adhesive film is not superposed on the inner surfaces is stored as the film region information in a storing portion configured to store a film region information representing the film region for each of sizes of recording mediums.

2. A image forming system according to claim 1, further comprising an input portion through which an execution instruction of the operation in the image forming mode and the operation in the pressure-bonding processing mode based on display of said display portion is capable of being inputted by a user, wherein in a case that the toner image to be formed on the inner surface protrudes outside the film region, said control unit permits execution of the operation in the image forming mode and the operation in the pressure-bonding processing mode in accordance with the execution instruction received through said input portion.

3. A image forming system according to claim 1, further comprising an input portion through which an execution instruction of the operation in the image forming mode and the operation in the pressure-bonding processing mode based on display of said display portion is capable of being inputted by a user, wherein in a case that the toner image to be formed on the inner surface protrudes outside the film region, said control unit permits execution of the operation in the image forming mode while said control unit does not permit execution of the operation in the pressure-bonding processing mode, in accordance with the execution instruction received through said input portion.

4. A image forming system according to claim 1, further comprising an input portion through which a stop instruction of the operation in the image forming mode and the operation in the pressure-bonding processing mode based on display of said display portion is capable of being inputted by a user, wherein in a case that the toner image to be formed on the inner surface protrudes outside the film region, and said control unit does not permit execution of the operation in the image forming mode or the operation in the pressure-bonding processing mode in accordance with the stop instruction received through said input portion.

5. An image forming system according to claim 1, wherein said control unit discriminates whether or not the toner image to be formed outside the film region is present is discriminated by comparing a region in which the toner image is to be formed on the inner surfaces with the film region information depending on the size of the recording medium.

6. An image forming system according to claim 1, wherein said pressure-bonding processing unit includes:

a folding processing unit for performing bi-fold processing by folding the recording medium in the fold;

a supplying unit for supplying the adhesive film to the recording medium folded by said folding processing unit; and a pressure-bonding unit for subjecting the recording medium, to which the adhesive film is supplied by said supplying unit, to pressure-bonding processing under application of heat and pressure.

7. An image forming system according to claim 1, wherein said image forming unit is capable of forming the toner image on each of a first surface of the recording medium and a second surface of the recording medium opposite from the first surface, and wherein said pressure-bonding processing unit includes:

a folding processing unit configured to tri-fold the recording medium so that a first region of the first surface is folded at a first folding position to become a first inner surface and a second region of the second surface is folded at a second folding position to become a second inner surface;

a supplying unit configured to supply the adhesive film to each of the first inner surface and the second inner surface of the recording medium tri-folded; and a pressure-bonding unit configured to press-bond the recording medium tri-folded, to which the adhesive film is supplied by said supplying unit, by applying heat and pressure.

* * * * *